United States Patent [19]

Tomaszewski

[11] Patent Number: 4,512,680
[45] Date of Patent: Apr. 23, 1985

[54] CHANNEL CONNECTOR

[75] Inventor: Walter Tomaszewski, Canton, Ohio

[73] Assignee: The Firestone Tire & Rubber Company, Akron, Ohio

[21] Appl. No.: 602,864

[22] Filed: Apr. 23, 1984

[51] Int. Cl.³ .............................................. F16B 2/02
[52] U.S. Cl. .................................... 403/313; 403/363
[58] Field of Search ............... 403/309, 313, 314, 306, 403/300, 363, 305, 302

[56] References Cited

U.S. PATENT DOCUMENTS

| | | | |
|---|---|---|---|
| 749,391 | 1/1904 | Lutz | 403/313 |
| 3,900,269 | 8/1975 | Pavlot | 403/292 |
| 4,140,417 | 2/1979 | Danielsen et al. | 403/406 |
| 4,174,911 | 11/1979 | Maccario et al. | 403/303 |
| 4,412,756 | 11/1983 | Dunwoodie et al. | 403/363 |

FOREIGN PATENT DOCUMENTS 515486  12/1939  United Kingdom ................ 403/363

Primary Examiner—Andrew V. Kundrat
Attorney, Agent, or Firm—Ernst H. Ruf

[57] ABSTRACT

An improved channel connector for channel members, used in mechanical fastening systems for mechanically securing a flexible sheet relative thereto, each channel member being of generally rectangular form, transverse cross section, and each channel connector being comprised of a flexible resilient material of a shape generally corresponding to that of the channel members and having bottom, side and top walls enveloping the corresponding adjacent walls of the channel members; transverse abutment means, having opposed sides, emanating from the top walls at about the midpoint of the channel connector axial extent; and a channel connector bottom wall having one or more apertures of a predetermined size whose axially outermost extents, relative to the abutment means, are equally axially spaced from the opposed sides of the abutment means and of a dimension so as to cooperate with protrusions in the bottom wall of the channel members so as to physically bias their end surfaces against the opposed sides of the abutment means.

11 Claims, 7 Drawing Figures

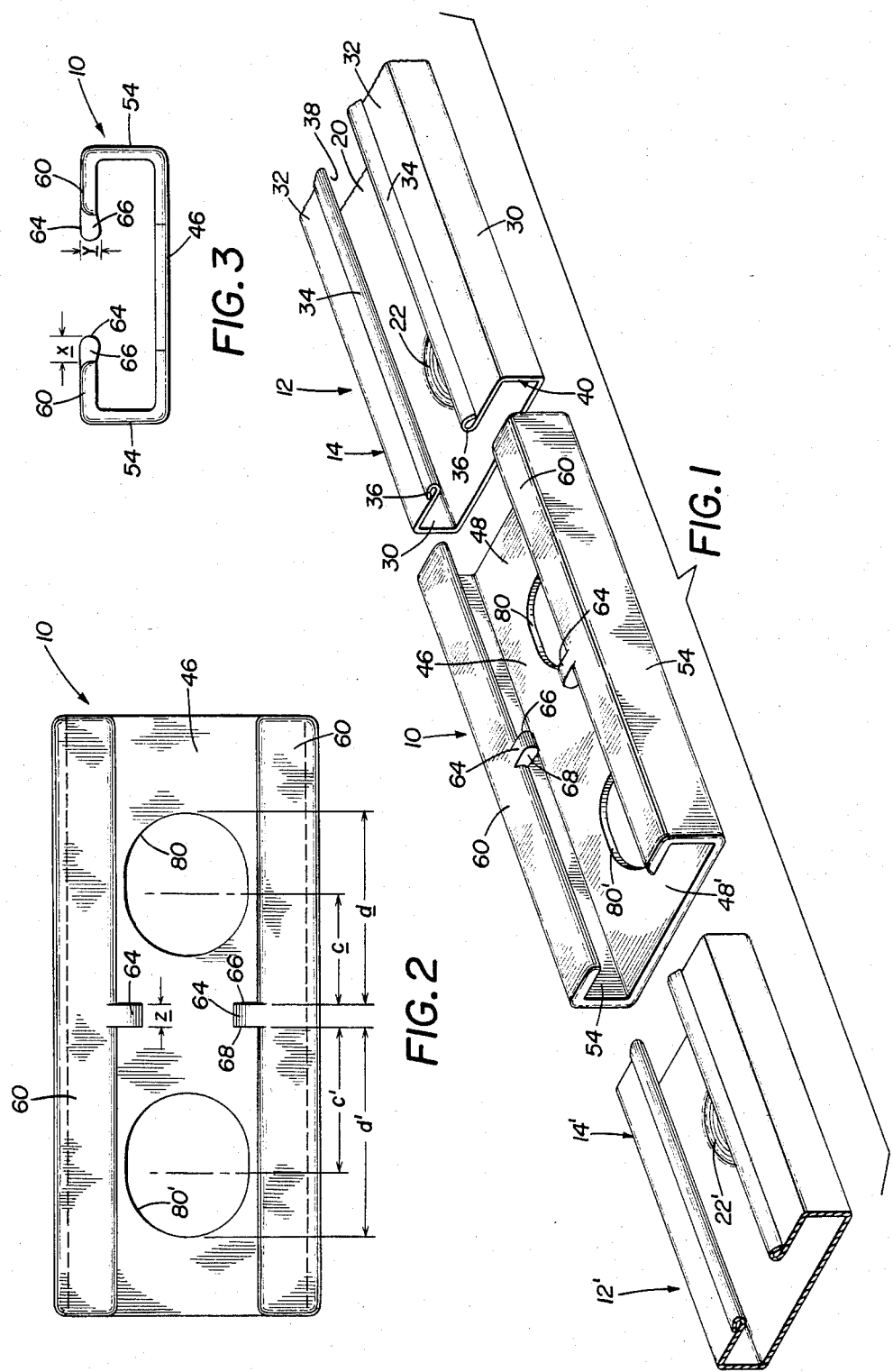

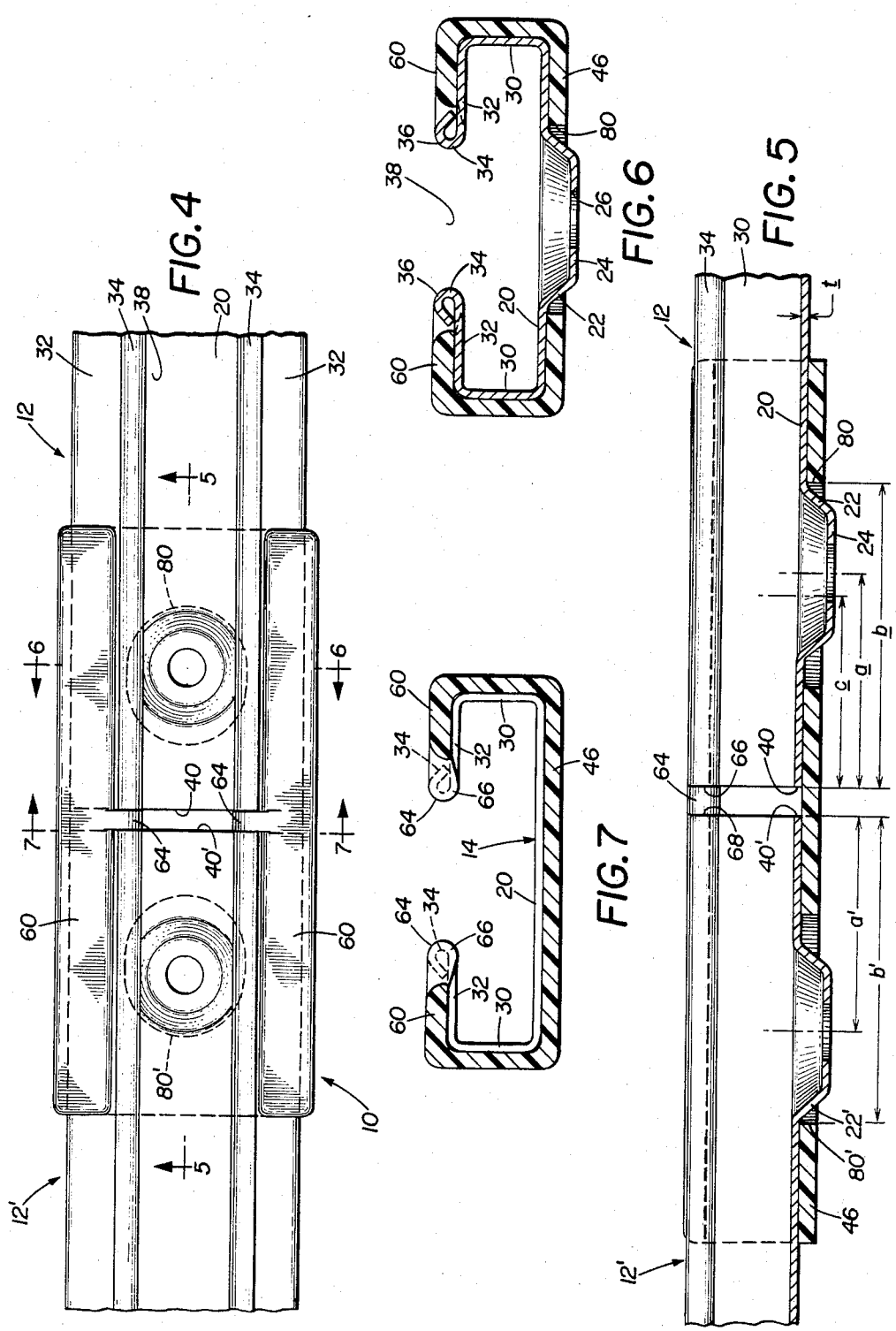

CHANNEL CONNECTOR

TECHNICAL FIELD

The field of art to which this invention pertains is that of mechanical fastening systems, particularly to improved channel connectors for channel members used in attachment devices for mechanically securing a flexible sheet, without puncturing same, within channel members via either a flexible resilient insert member or a ductile rigid insert member, adapted for fixedly retaining the flexible sheet within the channel member.

BACKGROUND OF THE ART

Co-pending U.S. patent application Ser. No. 516,622 to Yang, et al., filed July 25, 1983, and assigned to common assignee, discloses a mechanical fastening system for securing a flexible sheet within a channel member via an insert member wherein the latter is made of a flexible resilient material having a central longitudinal flex notch that serves to define two adjacent wing portions and permits a temporary elastic deformation of the insert member into an inverted V-shape for insertion of the insert member, together with adjacent portions of the flexible sheet, into the channel member. In the interest of full disclosure, this application is incorporated herein by reference to the extent necessary to explain this particular mechanical fastening system.

Co-pending U.S. patent application Ser. No. 516,618 to Yang, et al., filed July 25, 1983 and assigned to common assignee, discloses a further attachment device for securing flexible sheets within a channel member via an insert member of generally inverted V-shape wherein the latter is made of a ductile but rigid material having a central longitudinal material portion of reduced rigidity that serves to define two adjacent wing portions and permits the subsequent plastic deformation of the insert member into its installed shape after its insertion, together with adjacent portions of the flexible sheet, into the channel member. Again, in the interest of full disclosure, this application is incorporated herein by reference to the extent necessary to explain this particular attachment device.

In both the previously-noted mechanical fastening system and attachment device, preferably metallic channel members are utilized to produce long tracks, with these tracks having ends, which are either factory cuts or field end cuts. The channel members must initially be adhered to a substrate and the system, to a large extent, relies substantially on the skillfulness of a roofer for providing the proper vertical and horizontal alignment between succeeding channel members as well as providing adequate expansion gaps therebetween. This application method has proven both too time-consuming and too dependent upon individual skills. Misalignment during installation may cause occasional flexible sheet or membrane damage via cutting or tearing at channel ends. Pinching of the membrane between adjacent channel ends, due to inadequate expansion gaps therebetween, can also result in premature membrane failure.

DISCLOSURE OF THE INVENTION

The present invention provides a solution to the problems of horizontal and vertical misalignment of adjacent ends of succeeding channel members as well as providing a predetermined expansion gap between the noted channel ends by utilizing an improved channel connector for physically connecting and spacing the adjacent end portions of a pair of succeeding channel members. The channel connector is comprised of a flexible resilient material of a generally rectangular form, in transverse cross section and of a predetermined axial extent having bottom and side walls enveloping the corresponding adjacent walls of the channel members, the channel connector also having top walls enveloping at least the transverse outermost portions of the top walls of the channel members.

The improved channel connector of the present invention further includes transverse abutment means, having first and second opposed sides, emanating from the top walls, at about the midpoint of the channel connector axial extent, wherein the abutment means preferably takes the form of opposed tangs or tabs whose transverse extents are substantially less than that of the bottom wall.

The channel connector bottom wall has one or more apertures of a predetermined size greater than the size of channel member bottom protrusions, these apertures having their outermost axial extents, relative to the abutment means, substantially equally spaced from the first and second opposed sides of the abutment means, said spacings being such that the apertures cooperate with the protrusions of the channel members to physically bias the axial outer end surfaces of the channel members against the first and second sides of the abutment means, respectively.

In a preferred embodiment of the channel connector of this invention, the channel connector bottom wall has spaced first and second apertures of a predetermined size centered a predetermined axial distance from the first and second sides of the abutment means, with the apertures preferably being substantially oval in shape and their major axes coinciding with the major axis of the bottom wall.

The improved channel connector of the present invention not only permits both the horizontal and vertical alignment of the adjacent ends of succeeding channel connectors but also provides a predetermined expansion gap thereby inhibiting not only any possible cutting, tearing or pinching of the elastic membrane but also simplifying the installation procedure as well as reducing time and skill levels.

Other features and advantages of the present invention will become more readily understood by persons skilled in the art when following the best mode description in conjunction with the several drawings.

BRIEF DESCRIPTION OF THE DRAWINGS

FIG. 1 is an exploded view, in perspective, of the improved channel connector of the present invention together with two channel members, in the unassembled condition.

FIG. 2 is a top plan view of the channel connector.

FIG. 3 is an end view of the channel connector.

FIG. 4 is a top plan view of the channel connector and the two channel members in the assembled condition.

FIG. 5 is an enlarged longitudinal sectional view taken on line 5—5 of FIG. 4.

FIG. 6 is an enlarged transverse sectional view taken on line 6—6 of FIG. 4.

FIG. 7 is an enlarged transverse sectional view taken on line 7—7 of FIG. 4 showing one side of the abutment means of the present invention.

BEST MODE FOR CARRYING OUT THE INVENTION

Referring now to the drawings, specifically FIG. 1, there is illustrated in an exploded view, in perspective, the improved channel connector 10 of the present invention which is designed to fit over and substantially envelop end portions 14 and 14' of axially aligned but spaced first and second channel members 12 and 12', respectively, in a manner to be described hereinafter.

Only one channel member will be described since channel members 12, 12' are substantially similiar. Channel member 12, as best seen in FIGS. 1 and 6 and usually of a rigid, preferably metal construction of finite length and predetermined material thickness t (FIG. 5), is of generally rectangular form in transverse cross section (see FIG. 6) having a substantially flat bottom wall 20, which in turn may be provided with a plurality (one shown) of longitudinally spaced outwardly directed protrusions or recesses 22 each provided with a bottom wall 24 having a central aperture 26, the latter permitting the passage therethrough of the body portion of a fastener (not shown). The ends of channel bottom wall 20 merge into opposed, similarly projecting parallel sidewalls 30, which in turn merge into inwardly directed and converging spaced top walls 32, parallel to and equally spaced from bottom wall 20, whose inner but spaced smooth and opposed turned-over edge portions 34, serve to define a constricted central longitudinal slot or opening 38. The axial outer end surface of each edge portion 34 is denominated by numeral 36, with the axial outer end surface of channel member 12, as defined by the axial outer end surfaces of walls 20, 30, 32 and surfaces 36 being denominated by numeral 40. Protrusions 22 are of a predetermined common diameter and spaced a predetermined distance from each other (not shown) and centered a predetermined distance a (FIG. 5) from channel axial end surface 40.

Turning now to channel connector 10, as best seen in FIGS. 1, 2 and 3, it is preferably constructed of a flexible resilient material such as for example, a polypropylene copolymer, but other plastic, elastomeric or rubber-type materials can also be utilized. Channel connector 10 is also of generally rectangular form, in transverse cross section, and with the exception of its top walls, substantially complementary with that of channel member 12, as best seen in FIG. 6. Channel connector 10 has a predetermined axial extent or length preferably at least twice that of the transverse extent of channel member 12 and a substantially flat bottom wall 46 of predetermined thickness and complementary with channel member bottom wall 20. The transverse ends of bottom wall 46 merge into opposed similarly upwardly projecting parallel side walls 54, complementary with channel side walls 30, with side walls 54 in turn merging into inwardly converging spaced top walls 60 parallel to and equally spaced from bottom wall 46. While preferably fully complementary in shape with channel member top walls 32, less edge portions 34, the transverse extent of top walls 60 may also be somewhat less than that of channel member top walls 32. Connector top walls 60, however, must extend sufficiently in the transverse direction to securely envelop channel member side walls 30 and permit the sliding movement of channel connector 10 relative to channel members 12 to allow the assembly thereof in the manner depicted in FIG. 4.

Connector top walls 60, preferably near the center of their axial extent, are provided with aligned abutment means 64 which preferably take the form of transversely extending or inwardly directed tabs or tangs. Each tang 64, having opposed vertical side walls 66, 68, has an axial dimension z, a wall thickness y, and a transverse extent x, with the surfaces of each side wall 66, 68 being substantially equal in size and shape to those of areas 36. Channel connector bottom wall 46 is preferably provided with substantially similar spaced first and second apertures or openings 80 and 80', only one of which will be described since they and their location relative to abutment means 64 are substantially similar. Aperture 80, which is preferably elongated or oval in shape, has a minor axis or transverse dimension that is similar to or slightly greater than the diameter of channel member protrusion 22, but its major axis or axial dimension is greater than the diameter of protrusion 22. As best seen in FIG. 5, the distance c from the center of aperture 80 to facing tang wall surface 66 of abutment means 64 is less than the distance a from the center of channel member protrusion 22 to channel member axial end surface 40. Furthermore, the distance d (FIG. 2), i.e., the distance from the axially outermost portion of the wall defining aperture 80 to abutment means wall portion 66 is preferably slightly less than the distance b (FIG. 5), namely the distance from the axially most rearward portion of protrusion 22 to channel connector axial end surface 40. In the assembled condition of channel members 12 and 12' with channel connector 10, abutment means wall portions 66, 68 lie in common planes with channel member axial end surfaces 40, 40', respectively.

It should be understood of course that the immediately preceding description also applies in the same manner to aperture 80' and channel connector 12'. Thus, due to the slight interference or press fit resulting from the fitment of channel end portions 14 and 14' relative to channel connector 10, the axial rearward portions of protrusions 22 and 22' make physical contact with the axial rearward wall portions defining apertures 80 and 80' respectively, thus physically biasing channel member end surface 40 and 40' into contact with abutment means wall surfaces 66 and 68, respectively. Another mode in which this could be accomplished is to utilize but one very large oval aperture 80" (not shown) which would encompass both apertures 80 and 80' while retaining their transverse dimension.

FIG. 5 also shows that, due to the oval extent of apertures 80 and 80', one or both of channel members 12 and 12' are axially movable in the inward direction, i.e., toward each other, although such movement will result in at least the elastic deformation of abutment means 64. Such displacement of one or both of channel members 12, 12' may occur as a result of thermal expansion, with the dimensions of abutment means 64 being such so as to permit this deformation. The inherent elasticity of channel connector 10 also permits a slip-fit assembly relative to channel members 12, 12', with channel connector bottom wall portions 48, 48', e.g., the portions of bottom walls 46, 46' axially outwardly of apertures 80 and 80', respectively, deforming sufficiently to permit the passage thereover of channel member protrusions 22 and 22', respectively.

As previously noted, the transverse extent or width of channel connector top walls 60 may be substantially less than those of channel member top walls 32 and if this is the case it permits, in addition to the sliding assembly already described, the snap-type of assembly of channel members 12, 12' relative to channel connector 10. Initially, one channel member side wall 30 and portion of its top wall 32 are placed under one channel connector top wall 60, followed by the application of a downward force on the remaining connector top wall 60, thereby elastically deforming the opposing channel connector side wall 54 and thus permitting channel member 12 or 12' to snap into channel connector 10. It should be understood that if connector top walls 60 are of transverse extents less than those of channel member top walls 32, the extent of such decreases must be added to the transverse extents x of tangs 64 so that the latter fully cover areas 36 of channel member edge portions 34.

From the previous description it should be clear that the assembly of channel connector 10 relative to channel member end portions 14, 14' merely entails sliding the one relative to the other after first axially aligning same in the manner shown in FIG. 1 or snap-fitting same in the manner previously described.

The improved channel connector of the present invention finds specific utility in mechanical fastening systems utilized for securing EPDM sheeting in roofing applications. However, from the foregoing description, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. The combination of a channel connector for physically connecting and spacing the adjacent end portions of a pair of first and second axially aligned substantially similar channel members, each of said channel members being of generally rectangular form, in transverse cross section, having a substantially flat bottom wall, similarly projecting side walls, and top walls parallel to said bottom wall, said top walls having contoured inner edges separated by a continuous central longitudinal slot, each of said channel members further including an outwardly directed protrusion centered a first distance from the channel member axial outer end surface and having a first dimension, said channel connector being comprised of a flexible resilient material of a generally rectangular form, in transverse cross section, and of a predetermined axial extent having:
   (a) bottom and side walls enveloping the corresponding adjacent walls of said channel members, said channel connector also having top walls enveloping at least the transverse outermost portions of the top walls of said channel members;
   (b) transverse abutment means, having first and second opposed sides, emanating from said top walls, at about the midpoint of said channel connector axial extent; and
   (c) said channel connector bottom wall having one or more apertures of a predetermined size greater than the first dimensions of said channel member protrusions, said apertures having their outermost axial extents, relative to said abutment means, substantially equally spaced from said first and second opposed sides of said abutment means, said axial spacings being centered a distance less than the first distances of said channel members, said apertures thus cooperating with the protrusions of said channel members so as to physically bias the axial outer end surfaces of said channel members against the first and second sides of said abutment means respectively.

2. The combination of claim 1 wherein said abutment means takes the form of opposed tangs or tabs whose transverse extents are substantially less than said central longitudinal slot.

3. The combination of claim 1 wherein said channel connector bottom wall has spaced first and second apertures of a predetermined size centered a predetermined axial distance from said first and second sides of said abutment means, respectively.

4. The combination of claim 1 wherein said first dimension of said first channel member protrusion is of a first length and the dimension of each of said channel connector bottom wall apertures is of a further length, with said further length being at least as great as said first length.

5. The combination of claim 1 wherein said first dimension of said channel member protrusions is of a first diameter and each of said channel connector bottom wall apertures is substantially oval in shape whose minor axis is of a length approximate that of said first diameter while its major axis is of a length greater than that of said first diameter, thus permitting relative sliding axial movement between said second channel members and said channel connector.

6. The combination of claim 1 wherein the axial extent of said channel connector top walls envelops all but the contoured inner edges of said channel member top walls.

7. A channel connector comprised of a flexible resilient material, of a generally rectangular form in a transverse cross section, of a predetermined axial extent having:
   (a) a substantially flat bottom wall, similarly projecting side walls and top walls, parallel to said bottom wall, said top walls being separated by a continuous central longitudinal slot;
   (b) transverse abutment means, having first and second opposed sides, emanating from said top walls, at about the midpoint of said channel connector axial extent; and
   (c) said bottom wall having one or more apertures of a predetermined size whose axially outermost extents, relative to said abutment means, are equally axially spaced from said first and second opposed sides of said abutment means.

8. The channel connector of claim 7 wherein the transverse extent of said abutment means is substantially less than the transverse extent of said central longitudinal slot.

9. The channel connector of claim 7 wherein said bottom wall has spaced first and second apertures of a predetermined size centered a predetermined axial distance from said first and second sides of said abutment means, respectively.

10. The channel connector of claim 7 wherein its axial extent is at least twice its transverse extent.

11. The channel connector of claim 7 wherein said apertures are substantially oval in shape and whose major axis coincides with that of said bottom wall.

* * * * *